United States Patent
Mutou et al.

(10) Patent No.: US 11,024,109 B2
(45) Date of Patent: Jun. 1, 2021

(54) VALUABLE MEDIUM PROCESSING APPARATUS

(71) Applicant: GLORY LTD., Himeji (JP)

(72) Inventors: Shigeo Mutou, Hyogo (JP); Ryuji Kataoka, Himeji (JP); Atsushi Sakamoto, Himeji (JP); Mitsushi Nagao, Himeji (JP)

(73) Assignee: Glory Ltd., Hyogo (JP)

( * ) Notice: Subject to any disclaimer, the term of this patent is extended or adjusted under 35 U.S.C. 154(b) by 0 days.

(21) Appl. No.: 16/826,670

(22) Filed: Mar. 23, 2020

(65) Prior Publication Data

US 2020/0312077 A1 Oct. 1, 2020

(30) Foreign Application Priority Data

Mar. 25, 2019 (JP) .............................. JP2019-056236

(51) Int. Cl.
| | |
|---|---|
| *G07D 11/30* | (2019.01) |
| *G06K 1/12* | (2006.01) |
| *G07D 11/00* | (2019.01) |

(52) U.S. Cl.
CPC ............. *G07D 11/30* (2019.01); *G06K 1/121* (2013.01); *G07D 11/009* (2013.01); *G07D 2211/00* (2013.01)

(58) Field of Classification Search
CPC .. G07D 11/30; G07D 11/009; G07D 2211/00; G06K 1/121
See application file for complete search history.

(56) References Cited

U.S. PATENT DOCUMENTS

| | | | |
|---|---|---|---|
| 6,067,530 A | 5/2000 | Brooks, Jr. | |
| 9,754,436 B1* | 9/2017 | Drasinover | .......... G07D 11/009 |
| 2001/0054643 A1 | 12/2001 | Siemens | |
| 2004/0178559 A1 | 9/2004 | Harty | |
| 2010/0174402 A1 | 7/2010 | Hattori | |
| 2012/0285788 A1 | 11/2012 | Akamatsu | |
| 2013/0213763 A1* | 8/2013 | Rao | ........................ G07D 11/12 |
| | | | 194/350 |
| 2015/0266689 A1* | 9/2015 | Hashimoto | ............. B65H 31/26 |
| | | | 271/207 |
| 2016/0031574 A1* | 2/2016 | Razzaboni | ................. B65B 7/02 |
| | | | 53/268 |
| 2018/0029730 A1 | 2/2018 | Yokoo | |

FOREIGN PATENT DOCUMENTS

| | | |
|---|---|---|
| JP | 2015040113 A | 3/2015 |
| WO | 2018075555 A1 | 4/2018 |

OTHER PUBLICATIONS

Extended European Search Report for European Application No. 20165671.7-1009 dated Aug. 7, 2020.

* cited by examiner

*Primary Examiner* — Laura A Gudorf
(74) *Attorney, Agent, or Firm* — Renner, Kenner; Edward G. Greive (57) ABSTRACT

A valuable medium processing apparatus that includes a mounting section which is set to either a first state in which a storage unit that stores a valuable medium is not mounted or a second state in which the storage unit is mounted, and a control section that performs, based on selection of the mounting section, a switching process between the first state and the second state of the selected mounting section.

15 Claims, 8 Drawing Sheets

| | 600 | |
|---|---|---|
| FRAME INFORMATION | RECOGNITION INFORMATION ON STORAGE BAG | |
| A | 123456789 | |
| B | 987654321 | |

FIG. 8

| | 600 | |
|---|---|---|
| FRAME INFORMATION | RECOGNITION INFORMATION ON STORAGE BAG | |
| A |  | |
| B | 987654321 | |

VALUABLE MEDIUM PROCESSING APPARATUS

CROSS REFERENCE TO RELATED APPLICATIONS

This application is entitled to the benefit of Japanese Patent Application No. 2019-056236, filed on Mar. 25, 2019, the disclosure of which including the specification, drawings and abstract is incorporated herein by reference in its entirety.

TECHNICAL FIELD

The present invention relates to a valuable medium processing apparatus.

BACKGROUND ART

PTL 1 discloses a technology with a plurality of types of storage cassettes for storing a medium and a plurality of types of cassette attaching portions to which only a corresponding type of storage cassette among the plurality of types of storage cassette can be attached, and the technology prevents a wrong cassette from being attached.

In the plurality of types of storage cassettes in PTL 1, an engaging portion engaging with a cassette attaching portion is configured to be freely detachably attached to an outer surface of a storage cassette, the attaching position of the engaging portion is different for each type, and a labeling portion for indicating the type of the storage cassette and the attaching position corresponding to the type is provided on the outer surface.

CITATION LIST

Patent Literature

PTL 1
Japanese Patent Application Laid-Open No. 2015-040113

SUMMARY OF INVENTION

Technical Problem

In PTL 1, however, the engaging portion is attached to the outer surface of a storage cassette so that the storage cassette is attached to an attaching position of interest without error. For this reason, work for attaching the engaging portion in PTL 1 is troublesome.

An object of the present invention is therefore to provide a technology to easily prevent an error in a position for mounting a storage unit to a valuable medium processing apparatus.

Solution to Problem

The valuable medium processing apparatus of the present invention comprises a mounting section which is set to either a first state in which a storage unit that stores a valuable medium is not mounted or a second state in which the storage unit is mounted; and a control section that performs, based on selection of a mounting section, a switching process between the first state and the second state of the selected mounting section.

Advantageous Effects of Invention

The present invention makes it possible to easily prevent an error in a position for mounting a storage unit to a valuable medium processing apparatus.

DESCRIPTION OF EMBODIMENTS

Hereinafter, embodiments of the present invention will be described with reference to drawings. The valuable medium processing apparatus according to the present invention is an apparatus for processing valuable media, for instance, sheets such as banknotes, securities and ballots, coins, or the like. Hereinafter, an example in which the valuable medium processing apparatus according to the present invention is applied to a banknote processing apparatus for processing banknotes will be described.

Figure 1:
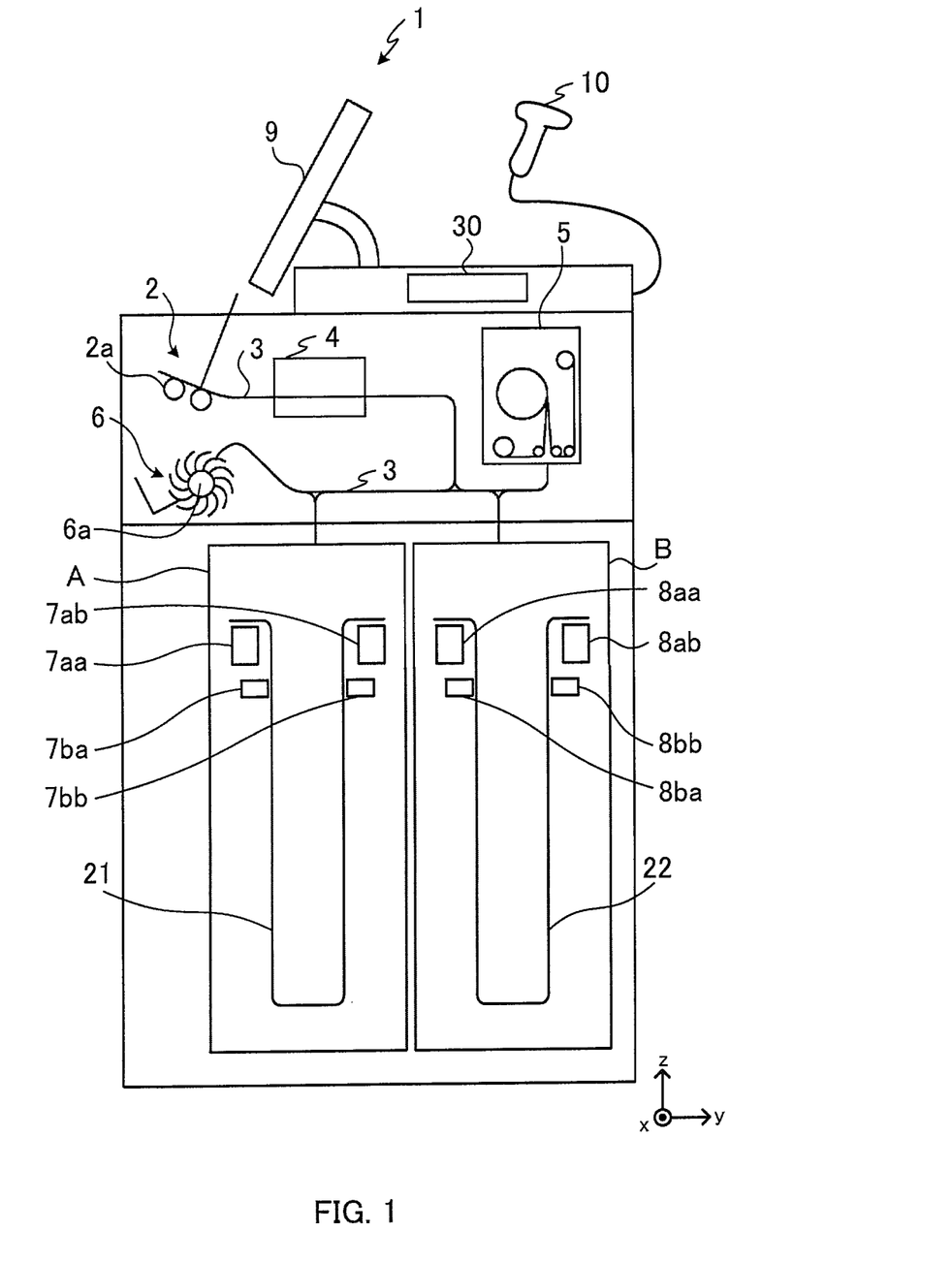
FIG. 1 is a schematic configuration diagram of a banknote processing apparatus.

FIG. 1 is a schematic configuration diagram of a banknote processing apparatus 1. As illustrated in FIG. 1, the banknote processing apparatus 1 comprises an inlet section 2, a transport unit 3, a recognition unit 4, a temporary storage section 5, an outlet section 6, storage frames A, B, a manipulation display 9, a recognition information acquisition section 10, and a control section 30. FIG. 1 illustrates a state in which storage bags 21, 22 are mounted on the storage frames A, B.

An example of the banknote processing apparatus 1 illustrated in FIG. 1 is a deposit processing apparatus. The banknote processing apparatus 1 is installed, for instance, in a front area or a back office area of a shop such as a supermarket, in a bank lobby, in the inside of a bank counter, or the like, and performs processes such as a deposit process.

It is an example that the banknote processing apparatus 1 is a deposit processing apparatus. The banknote processing apparatus 1 may be a depositing and dispensing machine comprising a cassette or tape type storage unit to be used at the time of dispensing.

Hereinafter, a rectangular coordinate system with the x-, y-, and z-axes in the positional relationship illustrated in FIG. 1 is set to the banknote processing apparatus 1.

Banknotes are input into the inlet section 2 by the user. The inlet section 2 comprises a feeding mechanism unit 2a which feeds out the input banknotes one by one to the transport unit 3. The inlet section 2 feeds out the banknotes input by the user one by one to the transport unit 3 by the feeding mechanism unit 2a.

The recognition unit 4 is provided in the periphery of the transport unit 3, at a position downstream of the inlet section 2, and upstream of the temporary storage section 5, the outlet section 6, and the storage frames A, B. The recognition unit 4 comprises various sensors (not illustrated), and recognizes denomination, authentication, face/back, fitness, new/old, and/or the like of banknotes to be transported by the transport unit 3. The banknotes to be transported by the transport unit 3 are transported to any of the temporary storage section 5, the outlet section 6, and the storage frames A, B (that is, the storage bags 21, 22) in accordance with recognition results of the recognition unit 4, manipulation of the user, or the like.

The temporary storage section 5 composes a tape type banknote storing/feeding mechanism in which the banknotes are wound around a drum by using a tape. The temporary storage section 5 temporarily stores the banknotes transported by the transport unit 3, and feeds out the temporarily stored banknotes to the transport unit 3. That is, the banknotes are transported from the inlet section 2 through the temporary storage section 5 to the storage bag 21 or 22.

The banknotes transported from the transport unit 3 are stacked in the outlet section 6. The outlet section 6 comprises a stacking wheel driving section 6a that rotates a stacking wheel. The outlet section 6 arrays and stacks the banknotes transported from the transport unit 3 by means of the rotating stacking wheel. The user can take out the banknotes stacked in the outlet section 6 from the front surface of the banknote processing apparatus 1.

The storage frame A comprises mounting sections 7aa, 7ab, and stages 7ba, 7bb. The storage bag 21 is mounted on the mounting sections 7aa, 7ab: the storage bag 21 whose opening is open is mounted on the mounting sections 7aa, 7ab. The banknotes to be transported by the transport unit 3 are stored in the storage bag 21 whose opening is open.

The stage 7ba moves toward the stage 7bb in accordance with a control of the control section 30 described below. The upper portion of the storage bag 21 is closed by the movement of the stage 7ba to the stage 7bb (see FIG. 6).

As with the storage frame A, the storage frame B comprises mounting sections 8aa, 8ab, and stages 8ba, 8bb. The storage bag 22 is mounted on the mounting sections 8aa, 8ab: the storage bag 22 whose opening is open is mounted on the mounting sections 8aa, 8ab. The banknotes to be transported by the transport unit 3 are stored in the storage bag 22 whose opening is open.

The stage 8ba moves toward the stage 8bb in accordance with a control of the control section 30. The upper portion of the storage bag 22 is closed by the movement of the stage 8ba to the stage 8bb.

An example of the manipulation display 9 is a touch screen. The manipulation display 9 displays various information relating to the banknote processing apparatus 1.

The manipulation display 9 displays, for instance, information relating to a processing status of a banknote deposit process, the inventory amount of banknotes stored in the storage bags 21, 22, or the like. In addition, the manipulation display 9 displays information for a user, a collector or the like to select the storage frames A, B on which the storage bags 21, 22 are mounted (for instance, see FIG. 7). Furthermore, the manipulation display 9 receives selection manipulation by a user, a collector or the like, and transmits information relating to the results of the selection to the control section 30.

The recognition information acquisition section 10 acquires recognition information which is given to the storage bags 21, 22 and which is specific to the respective bags. Examples of the recognition information acquisition section 10 that can be used include a handy type scanner and a barcode reader. The recognition information acquisition section 10 transmits the read recognition information to the control section 30.

The number of the storage frames is not limited to two and may be one, or three or more.

Figure 2:
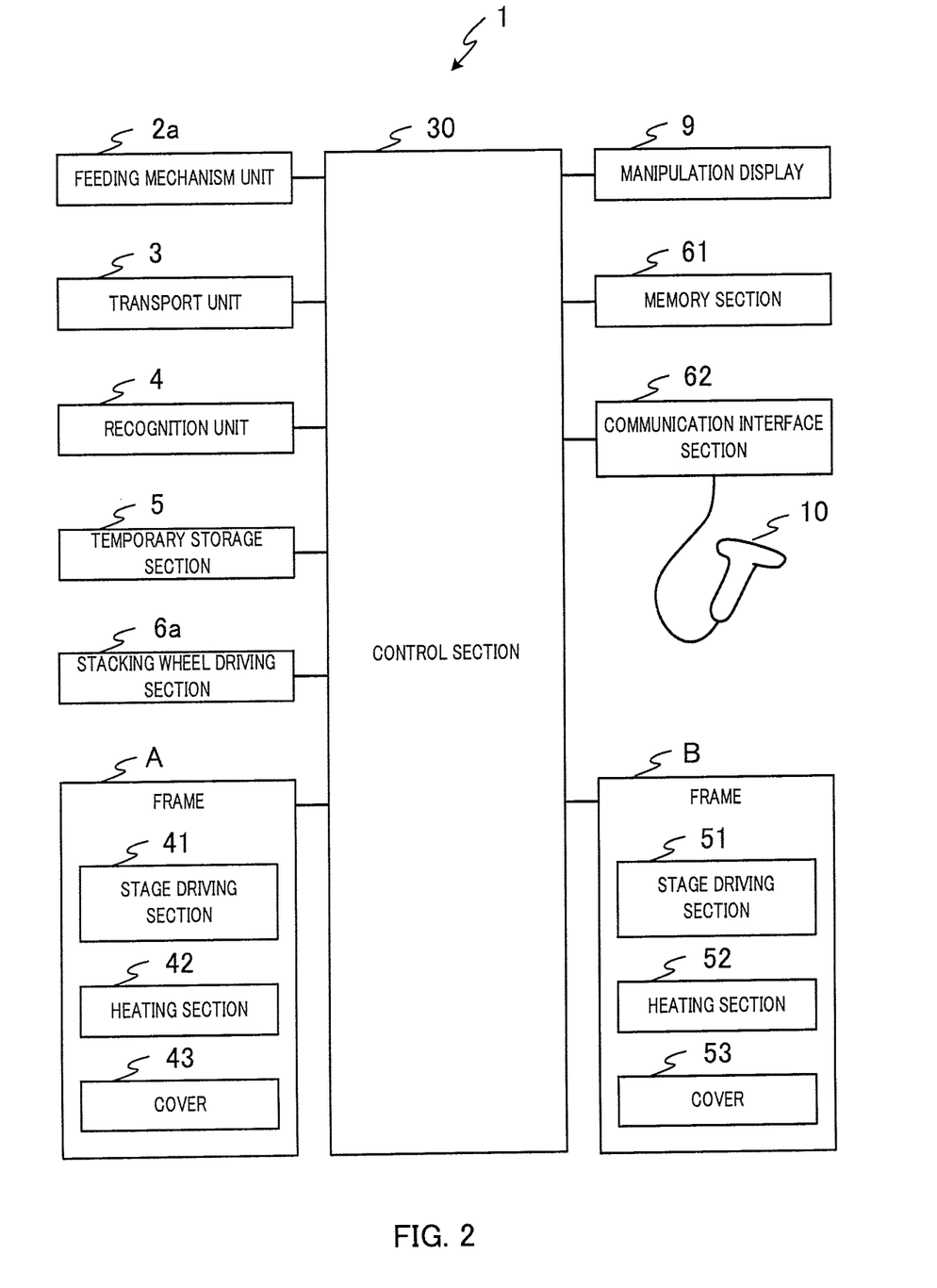
FIG. 2 is a diagram illustrating a block configuration example of a control system of the banknote processing apparatus.

FIG. 2 is a diagram illustrating a block configuration example of a control system of the banknote processing apparatus 1.

The feeding mechanism unit 2a, the transport unit 3, the recognition unit 4, the temporary storage section 5, the stacking wheel driving section 6a, the storage frames A, B, and the manipulation display 9 are connected to the control section 30. Additionally, a memory section 61 and a communication interface section 62, which are not illustrated in FIG. 1, are connected to the control section 30. The control section 30 is composed of, for instance, a CPU (Central Processing Unit), and controls the connected respective sections.

The storage frame A comprises a stage driving section 41, a heating section 42, and a cover 43. The storage frame B comprises a stage driving section 51, a heating section 52, and a cover 53. The stage driving sections 41, 51, the heating sections 42, 52, and the covers 43, 53 will be described in detail below.

The memory section 61 is a storage device such as a memory. A program for operations of the control section 30, data for the control section 30 to perform a calculation process, data for the control section 30 to control the respective connected sections, and the like are stored in the memory section 61. In addition, e.g. recognition information "A" for recognizing the storage frame A, and recognition information "B" for recognizing the storage frame B are stored in the memory section 61. The recognition information "A" and the recognition information "B" are exemplary. The recognition information may be denoted with any other numbers, signs, or the like.

The recognition information acquisition section 10 is connected to the communication interface section 62. The recognition information acquisition section 10 acquires the recognition information given to the storage bags 21, 22.

The control section 30 performs a control for communicating with the recognition information acquisition section 10 through the communication interface section 62. The recognition information acquisition section 10 may be detachable from the communication interface section 62. That is, the recognition information acquisition section 10 may communicate with the communication interface section 62 by wire or wirelessly.

In addition, a host apparatus (not illustrated) is connected to the communication interface section 62 through, for instance, the Internet. The control section 30 performs a control for communicating with the host apparatus through the communication interface section 62. For instance, the control section 30 transmits information on the inventory amount of the banknote processing apparatus 1 or the like to the host apparatus through the communication interface section 62. The control section 30 also performs a control for transmitting the recognition information on the storage bags 21, 22 collected by a user, a collector or the like to the host apparatus.

The control section 30 associates the recognition information "A" on the storage frame A or the recognition information "B" on the storage frame B with the recognition information on the storage bags 21, 22 received by the communication interface section 62 and stores the associated information in the memory section 61.

Figure 3:
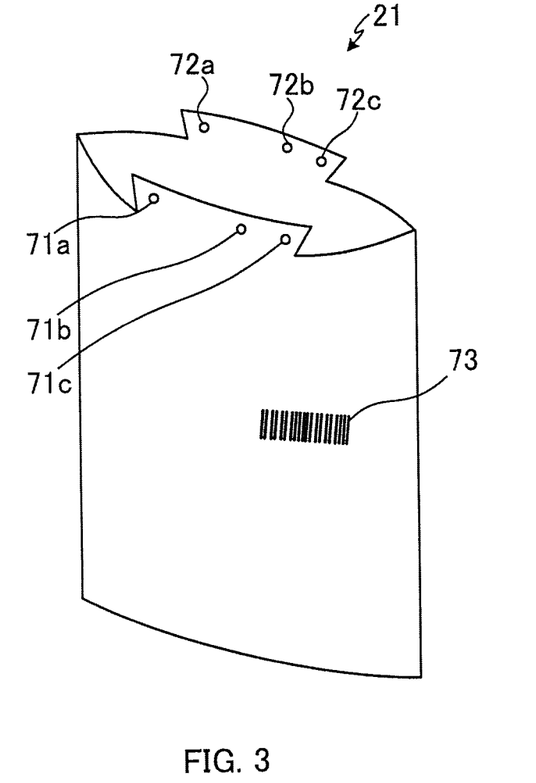
FIG. 3 is a perspective view of a storage bag.

FIG. 3 is a perspective view of the storage bag 21. As illustrated in FIG. 3, the storage bag 21 comprises holes 71a to 71c, and 72a to 72c in the upper portion. The interval between the holes 71a, 71b is different from the interval between the holes 71b, 71c, and the interval between the holes 71a, 71b is larger than the interval between the holes 71b, 71c.

Additionally, the interval between the holes 71a, 71b is the same as or substantially the same as the interval between the holes 72a, 72b opposite to the holes 71a, 71b. The interval between the holes 71b, 71c is also the same as or substantially the same as the interval between the holes 72b, 72c opposite to the holes 71b, 71c.

The storage bag 21 is formed of, for instance, a high-molecular compound such as polyethylene, a metal such as aluminum, or a combination thereof. An example of the material of the storage bag 21 is polyethylene. The storage bag 21 is flexible and can be thermally welded. The storage bag 21 comprises an opening in the upper portion. The banknotes transported by the transport unit 3 are stored in the storage bag 21 through the opening of the storage bag 21.

The recognition information specific to the storage bag 21 is given to an outer surface of the storage bag 21. The recognition information may be a character, a number or a sign, may be a character string composed of a combination thereof, or may be a barcode including the above as information. As a matter of course, the barcode may include a two-dimensional code. FIG. 3 illustrates a state in which a barcode 73 is given to the storage bag 21: the barcode 73 is given to an outer surface of the storage bag 21 by, for instance, printing. The recognition information may be given to both surfaces of the storage bag 21.

The storage bag 22 (see FIG. 1) has substantively a similar configuration to that of the storage bag 21 except that the storage bags 21 and 22 have different recognition information.

Figure 4:
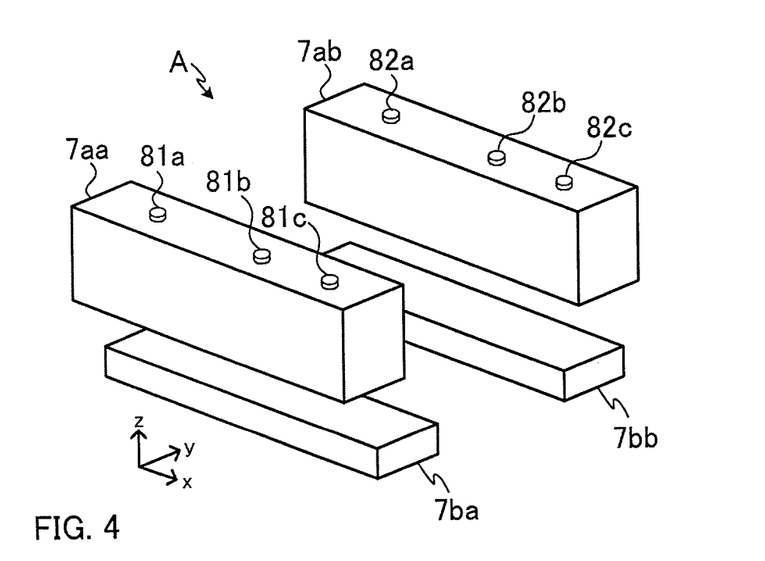
FIG. 4 is a perspective view of mounting sections and stages in a storage frame.
Figure 5:
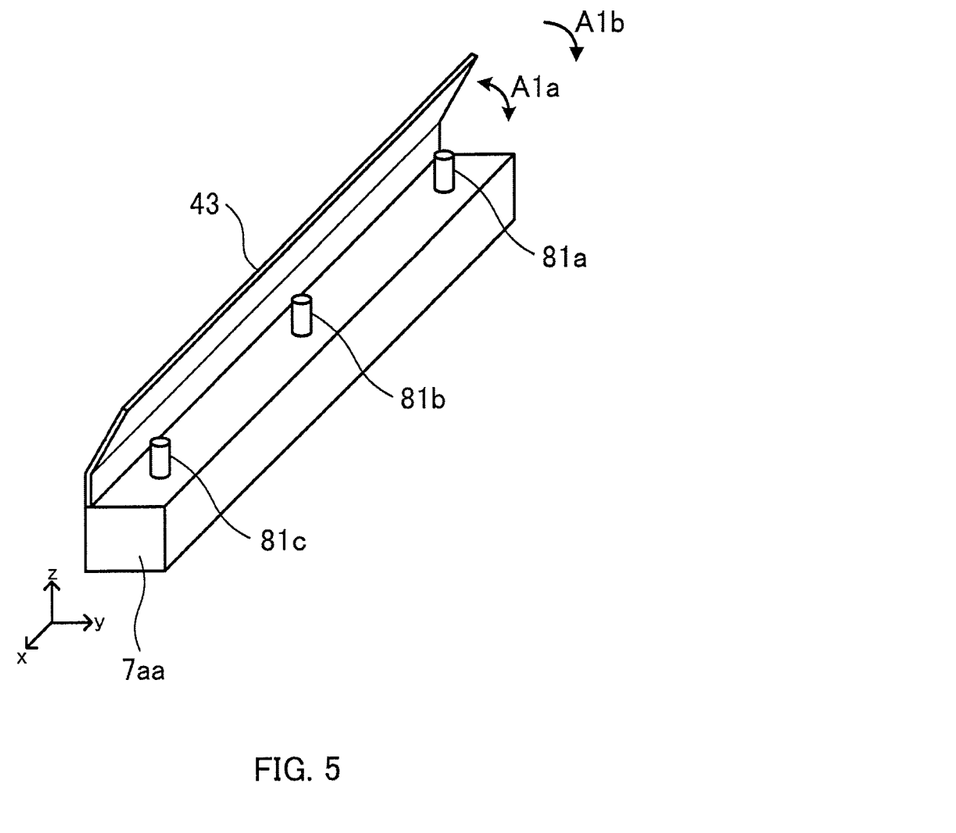
FIG. 5 is a perspective view of one of the mounting sections in the storage frame.

FIG. 4 is a perspective view of the mounting sections 7aa, 7ab and the stages 7ba, 7bb in the storage frame A. The cover 43 which will be described in FIG. 5 is omitted in FIG. 4.

As illustrated in FIG. 4, the mounting section 7aa comprises pins (projections) 81a to 81c on the upper surface. The mounting section 7ab comprises pins 82a to 82c on the upper surface. The upper surfaces of the mounting sections 7aa, 7ab are fixed to the storage frame A so as to have the same height in the z-axis direction. As a matter of course, the shape, size, height, and the like of each pin are not limited to those illustrated in FIG. 4 and may be modified in various ways. For instance, the shape thereof is not limited to a cylindrical shape as depicted, but may be a prismatic shape.

The interval between the pins 81a, 81b is different from the interval between the pins 81b, 81c. Specifically, the interval between the pins 81a, 81b is larger than the interval between the pins 81b, 81c. Additionally, the interval between the pins 81a, 81b is the same as the interval between the pins 82a, 82b opposite to the pins 81a, 81b.

Furthermore, the interval between the pins 81b, 81c is also the same as the interval between the pins 82b, 82c opposite to the pins 81b, 81c.

The interval between the pins 81a, 81b is the same as the interval between the holes 71a, 71b formed in the storage bag 21. The interval between the pins 81b, 81c is the same as the interval between the holes 71b, 71c. The interval between the pins 82a, 82b is the same as the interval between the holes 72a, 72b formed in the storage bag 21. Furthermore, the interval between the pins 82b, 82c is the same as the interval between the holes 72b, 72c. Accordingly, the pins 81a to 81c are engaged with the holes 71a to 71c provided in the storage bag 21, and the pins 82a to 82c are engaged with the holes 72a to 72c provided in the storage bag 21. That is, the storage bag 21 is mounted on the storage frame A so that the surface to which the barcode 73 is given is directed toward (that is, in the −y direction) the mounting section (that is, the mounting section 7aa) on which the side to which the barcode 73 is given (that is, in which the holes 71a to 71c are formed) is mounted. In other words, the storage bag 21 is not mounted such that the barcode 73 is directed in the +y direction.

That is, the storage bag 21 is mounted such that the barcode 73 is directed in a predetermined direction without error.

The stage 7ba is provided in the storage frame A so as to be movable in a direction to come into contact with or be separated from the stage 7bb, that is, in the ±y direction. The stage 7bb, on the other hand, is fixed to the storage frame A.

The stage 7ba is moved in a direction to come into contact with or be separated from the stage 7bb, that is, in the ±y direction by the stage driving section 41. The stages 7ba, 7bb are disposed so as to have the same height. When the stage 7ba moves in the +y direction, the stage 7ba comes into contact with the stage 7bb through the storage bag 21.

The stage 7bb may be provided in the storage frame A so as to be movable in a direction to come into contact with or be separated from the stage 7ba, that is, in the ±y direction, and the stage 7ba may be fixed to the storage frame A. In this case, the stage 7bb is moved in a direction to come into contact with or be separated from the stage 7ba, that is, in the ±y direction by the stage driving section 51. Furthermore, both the stages 7ba, 7bb may be provided in the storage frame A so as to be moveable in the ±y direction.

When the storage bag 21 is mounted on the mounting sections 7aa, 7ab, or when banknotes are stored in the storage bag 21, the stage 7ba is located at a position away from the stage 7bb (the position illustrated in FIG. 1 or 4). When the storage bag 21 is collected, on the other hand, the stage 7ba moves toward the stage 7bb. As a result, the opening of the storage bag 21 is closed (see FIG. 6).

FIG. 5 is a perspective view of the mounting section 7aa: one of the mounting sections in the storage frame A.

The cover 43 is mounted on the upper surface of the mounting section 7aa and on the opposite side to the side thereof where the mounting section 7ab is disposed. For instance, when the mounting section 7aa is a member having a rectangular parallelepiped shape with four ridges parallel to the x-axis, the cover 43 is mounted near the ridge located on the −y side and the +z side.

The cover 43 is rotatably mounted through a hinge or the like around an axis of rotation parallel to the x-axis with respect to the mounting section 7aa, that is, in a direction denoted by an arrow A1a. The cover 43 rotates so that the pins 81a to 81c are covered with the cover 43 or are exposed without being covered therewith. The example illustrated in FIG. 5 is a state in which the cover 43 is open, that is, the pins 81a to 81c are exposed. In this state (the second state), the storage bag 21 can be mounted on the mounting section 7aa by engaging the holes 71a to 71c provided in the storage bag 21 with the pins 81a to 81c.

When the cover 43 is closed from the state illustrated in FIG. 5, that is, rotates in a direction of an arrow A1b, the upper surfaces of the pins 81a to 81c are covered, which results in a state in which the holes 71a to 71c cannot be engaged with the pins 81a to 81c, that is, the storage bag 21 cannot be mounted on the mounting section 7aa (the first state).

That is, the cover 43 is configured to be capable of inhibiting the holes 71a to 71c provided in the storage bag 21 from being engaged with the pins 81a to 81c by the cover 43 rotating so that the relative position thereof with respect to the pins 81a to 81c changes.

In addition, a cover (not illustrated) is also mounted on the upper surface of the mounting section 7ab and on the opposite side to the side thereof where the mounting section 7aa is disposed. For instance, when the mounting section 7ab is a member having a rectangular parallelepiped shape with four ridges parallel to the x-axis, the cover is mounted near the ridge located on the +y side and the +z side.

The cover mounted on the mounting section 7ab is rotatably mounted through a hinge or the like around an axis of rotation parallel to the x-axis with respect to the mounting section 7ab. The cover rotates so that the pins 82a to 82c are covered with the cover or are exposed without being covered therewith. In this state in which the cover is open (the second state), that is, in a state in which the pins 82a to 82c are exposed, the storage bag 21 can be mounted on the mounting section 7ab by engaging the holes 72a to 72c provided in the storage bag 21 with the pins 82a to 82c.

When the cover mounted on the mounting section 7ab is closed from the above state, the upper surfaces of the pins 82a to 82c are covered, which results in a state in which the holes 72a to 72c cannot be engaged with the pins 82a to 82c, that is, the storage bag 21 cannot be mounted on the mounting section 7ab (the first state).

In addition, the cover 43 is locked by an electromagnetic locking mechanism (not illustrated) which is provided in the cover 43 or the mounting section 7aa and which uses a solenoid or the like. Specifically, in the state in which the cover 43 covers the upper surfaces of the pins 81a to 81c (the first state), the electromagnetic locking mechanism locks the cover 43 so that the cover 43 does not move. In this way, a user, a collector or the like no longer can change the state of the cover 43 by hand or the like. The conditions of the lock by the electronic locking mechanism will be described in detail below.

The means for maintaining the state in which the cover 43 cannot rotate is not limited an electronic locking mechanism, but may be any other means whereby the cover can be locked.

An electronic locking mechanism or any other means whereby the cover can be locked is also provided in the cover mounted on the mounting section 7ab or in the mounting section 7ab. In addition, only either the cover 43 or the cover mounted on the mounting section 7ab may be configured to be locked.

Figure 6:
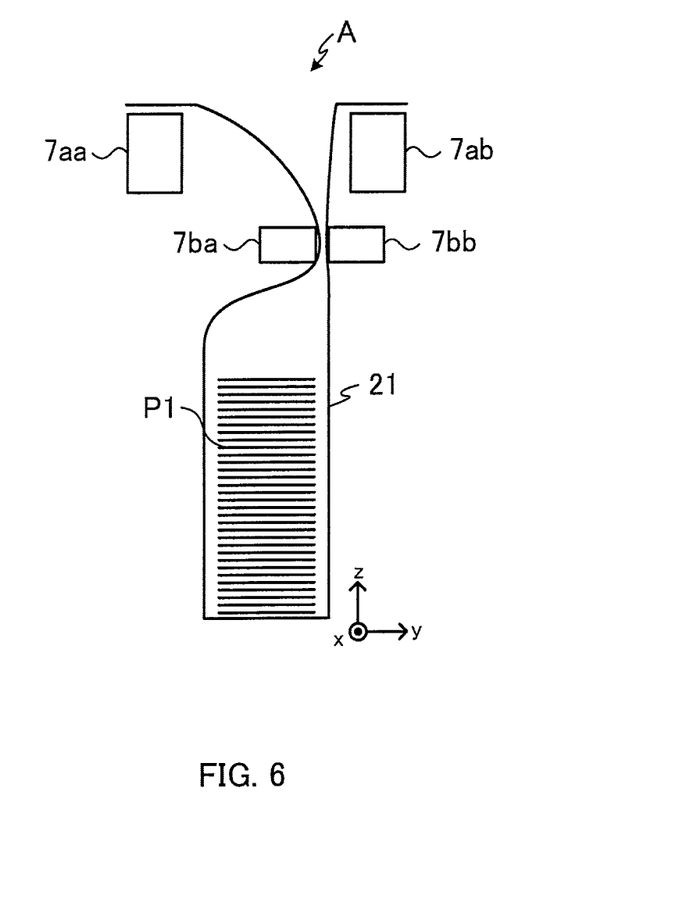
FIG. 6 is a diagram describing how an opening of the storage bag is closed.

FIG. 6 is a diagram describing how the opening of the storage bag 21 is closed. In FIG. 6, banknotes P1 are stored in the storage bag 21.

The stage 7ba is moved toward the stage 7bb (that is, in the +y direction) by the stage driving section 41. For instance, when the banknotes P1 are collected from the banknote processing apparatus 1, the stage 7ba moves toward the stage 7bb. In this way, the upper portion of the storage bag 21 is sandwiched (closed) by the stages 7ba, 7bb.

The stage 7ba comprises the heating section 42 such as a heater. The heating section 42 heats the surface of the stage 7ba, which is opposite to the stage 7bb. When the stage 7ba moves toward the stage 7bb and the opening of the storage bag 21 is closed, the temperature of the heating section 42 increases by a control of the control section 30. The heating section 42 may be provided in the inside of the stage 7ba or may be provided so as to be exposed to a surface of the stage 7ba. In addition, the heating section 42 may be provided in the stage 7bb or in both the stages 7ba, 7bb.

When the temperature of the heating section 42 increases, the portion of the storage bag 21 sandwiched by the stages 7ba, 7bb is thermally welded. In this way, the opening of the storage bag 21 is closed, and the banknotes P1 stored in the storage bag 21 are sealed in the storage bag 21.

Here, the mounting sections 7aa, 7ab and the stages 7ba, 7bb in the storage frame A are described. The same applies to the mounting sections 8aa, 8ab and the stages 8ba, 8bb in the storage frame B.

For instance, as with the mounting sections 7aa, 7ab, the mounting sections 8aa, 8ab also comprise pins on which the storage bag 22 is mounted. The stage 8ba is moved in the ±y direction by the stage drive portion 51. Additionally, the stage 8ba comprises the heating section 52 in the inside.

Hereinafter, operations of the banknote processing apparatus 1 according to the present embodiment are described. The description here is confined to manipulations or operations that particularly relate to the mounting of and the detaching of the storage bags. A description of naturally occurring manipulations or operations, which serve as the prerequisite for the above, or a description of manipulations or operations, which are arbitrary in terms of the specific timing to be performed, are omitted. For instance, a description of such a manipulation that requires opening or closing a door mounted on a housing of the banknote processing apparatus 1 when mounting or detaching a storage bag is omitted.

Figure 7:
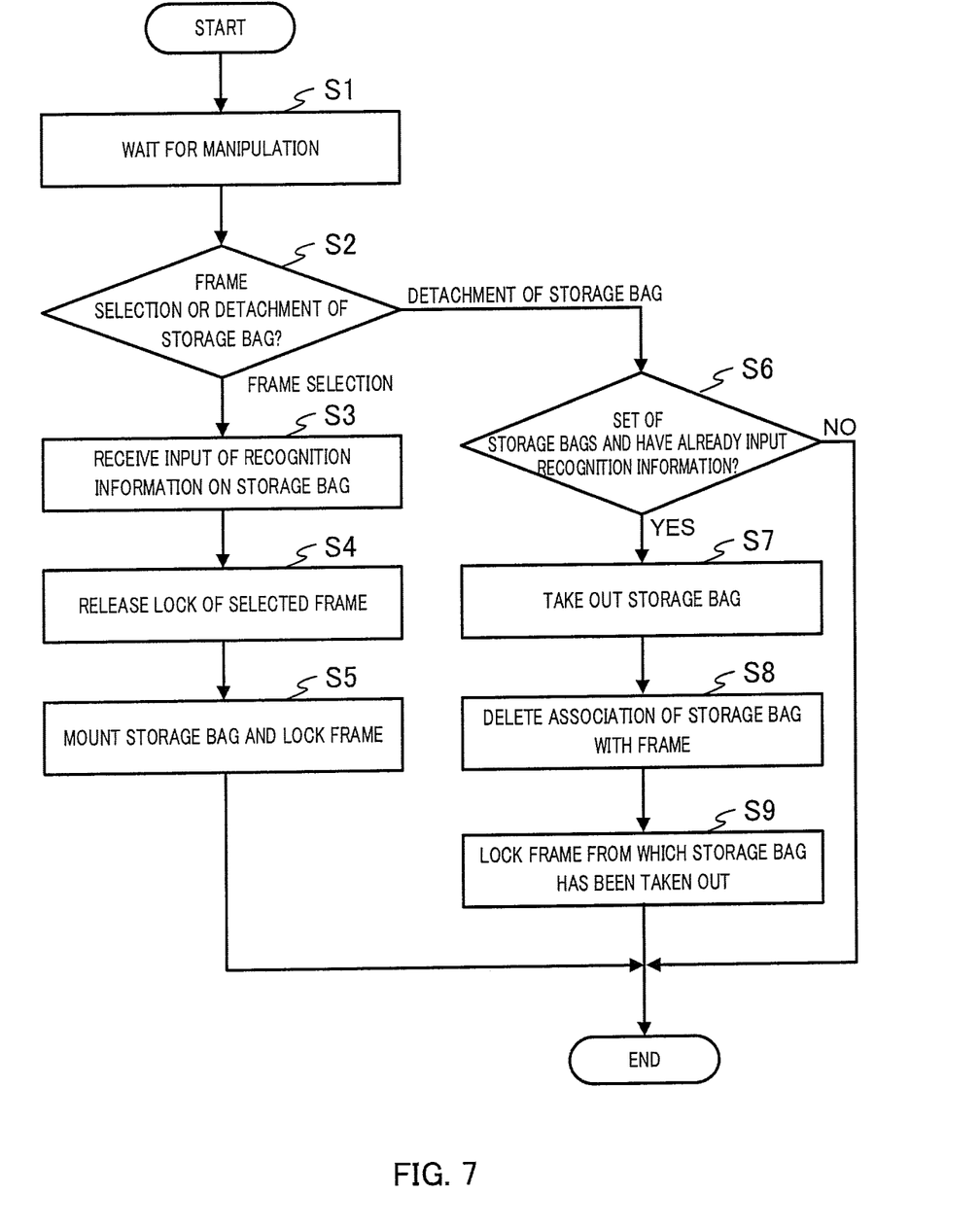
FIG. 7 is a flowchart exemplifying operations of the banknote processing apparatus.

FIG. 7 is a flowchart exemplifying operations of the banknote processing apparatus 1.

After the start of operations, the control section 30 waits for a manipulation from a user or the like (Step S1).

When a manipulation is performed by a user or the like through the manipulation display 9, the control section 30 determines whether the manipulation selects a storage frame on which a storage bag is mounted or detaches a storage bag from a storage frame (Step S2).

When the manipulation performed by a user or the like is a manipulation that selects a storage frame on which a storage bag is mounted (frame selection in Step S2), the control section 30 acquires information from the manipulation display 9 on which of the storage frames A, B has been selected.

The control section 30 then receives an input of the recognition information on the storage bag (Step S3).

Specifically, the recognition information acquisition section 10 reads a barcode given to a storage bag to be mounted on the selected storage frame, and the control section 30 acquires the recognition information specific to the storage bag.

Figure 8:
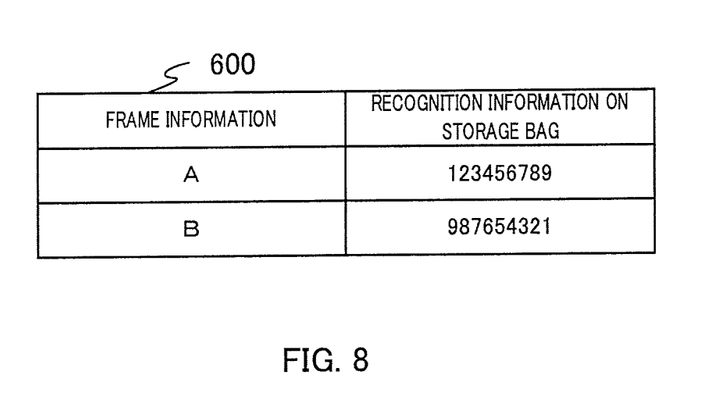
FIG. 8 is a diagram illustrating an example of information to be stored in a memory section.

The acquired recognition information is stored, for instance, in a format of a table 600 as shown in FIG. 8, in the memory section 61. That is, FIG. 8 exemplifies the information to be stored in the memory section 61. In the table 600, the information for recognizing the storage frame is stored in the left column, and the recognition information on the storage bag is stored in the right column. The storage frame recognition information and the storage bag recognition information in the same row correspond to each other. The table exemplified in FIG. 8 shows that a storage bag having the recognition information "123456789" is to be mounted on or has already been mounted on a storage frame having the recognition information "A", that is, the storage frame A. The table also shows that a storage bag having the recognition information "987654321" is to be mounted on or has already been mounted on a storage frame having the recognition information "B", that is, the storage frame B.

The table 600 may further have columns, not illustrated, where the information relating to the banknotes stored in the corresponding storage bags, such as serial numbers, numbers for each denomination, and total amounts, is stored.

Hereinafter, the description continues on the assumption that the selected storage frame is the storage frame A, the storage bag to be mounted on the storage frame A is the storage bag 21, and the recognition information given to the storage bag 21 is "123456789".

When an input of the recognition information on the storage bag 21 is received, the lock comprised by the storage frame selected as the storage frame on which the storage bag 21 is mounted, that is, the storage frame A, is released (Step S4).

Accordingly, a user or the like can open the cover 43 and the cover mounted on the mounting section 7ab (hereinafter, both are referred to collectively as the cover 43), can expose the pins 81a to 81c and the pins 82a to 82c, and can engage these pins with the holes 71a to 71c and the holes 72a to 72c that are formed in the storage bag 21. That is, a user or the like can mount the storage bag 21 on the storage frame A. After the storage bag 21 is mounted on the storage frame A, a user or the like closes the cover 43.

In the above case, the lock of the cover 53 of the mounting sections 8aa, 8ab, which the storage frame B comprises, is not released (that is, the first state is maintained). It is therefore possible to preliminarily prevent a user or the like from mistakenly mounting the storage bag 21 on the storage frame B.

After the cover 43 is closed, a user or the like manipulates the manipulation display 9, and inputs that the mounting of the storage bag 21 on the storage frame A has been completed. The control section 30 then locks the cover 43 (Step S5). The cover 43 may be automatically locked by closing the cover 43.

Thus, the operations of mounting the storage bag 21 on the storage frame A are completed. Similar operations are also performed when the storage frame B is selected as the storage frame on which a storage bag is mounted. In addition, the above-described steps (Steps S1 to S5) are repeated twice when it is necessary to mount a storage bag on each of the storage frames A, B. It is needless to say that the foregoing steps (Steps S1 to S5) are repeated three or more times when there are three or more storage frames and it is necessary to mount a storage bag on each of the storage frames.

As apparent from the above description, for mounting a storage bag on the storage frame A or B, a user or the like is required to select the storage frame to be mounted, and then to input the recognition information on the storage frame to be mounted so that the lock of the selected storage frame can be released. Thus, a storage bag can be correctly mounted on the selected storage frame. For instance, it is possible to prevent the storage bag to be mounted on the storage frame A from being mistakenly mounted on the storage frame B and/or to prevent the storage bag to be mounted on the storage frame B from being mistakenly mounted on the storage frame A.

Next, a case where the manipulation performed by a user or the like through the manipulation display 9 relates to the detaching of a storage bag (detachment of storage bag in Step S2) is described. In this case, the control section 30 acquires information from the manipulation display 9 on which of the storage frames A, B has been selected. The information to be acquired here may be the recognition information per se of a storage bag to be detached.

Thereafter, the control section 30 determines whether a storage bag has been mounted on the selected storage frame and whether the recognition information on the mounted storage bag has been correctly input (Step S6).

For instance, when the table 600 stored in the memory section 61 is as shown in FIG. 8, the storage bag having the recognition information 123456789 has been mounted on the storage frame A, and the storage bag having the recognition information 987654321 has been mounted on the storage frame B, which namely shows that storage bags have been mounted on both the storage frames A, B, and the recognition information on the storage bags has been correctly input at the time of mounting.

Accordingly, when the table 600 stored in the memory section 61 is as shown in FIG. 8, the control section 30 determines that a storage bag has been mounted on the storage frame, regardless of the selected storage frame being the storage frame A or B, and that the recognition information on the mounted storage bag has been correctly input.

When the control section 30 determines that a storage bag has been mounted on the selected storage frame and that recognition information on the mounted storage bag has been correctly input (yes in Step S6), the control section 30 permits the storage bag mounted on the selected storage frame to be detached (Step S7).

Specifically, the control section 30 releases the lock of the cover, which the selected storage frame comprises. Accordingly, the user can take out the storage bag from the selected storage frame.

When the selected storage frame is the storage frame A, the control section 30 releases the lock of the cover 43. Accordingly, the user can take out the storage bag 21 having the recognition information 123456789 from the storage frame A. In this case, the lock of the cover 53 of the mounting sections 8aa, 8bb, which the storage frame B comprises, is not released (that is, the first state is maintained). As a result, it is possible to preliminarily prevent the user from mistakenly taking out the storage bag from the storage frame B.

Figure 9:
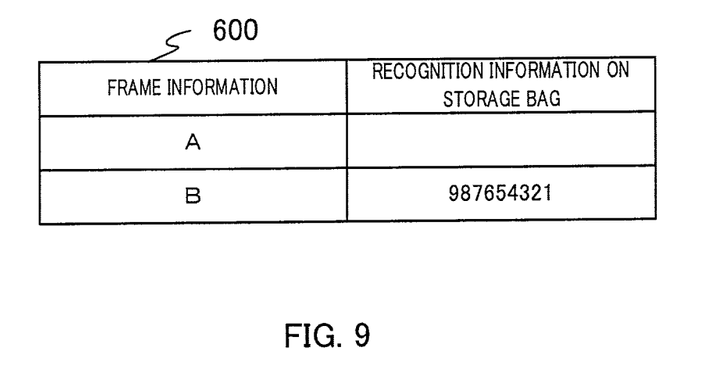
FIG. 9 is a diagram illustrating an example of information to be stored in the memory section.

When the storage bag is taken out from the selected storage frame, the control section 30 releases the association of the recognition information on the selected storage frame with the recognition information on the taken-out storage bag (Step S8). For instance, when the storage bag 21 is taken out from the storage frame A, the control section 30 deletes the recognition information 123456789 from the box corresponding to the storage frame A in the right column of the table 600 as shown in FIG. 9. That is, FIG. 9 shows an example of information to be stored in the memory section 61. Both the information relating to the box A corresponding to the storage frame A and the recognition information on the storage bag 21 may be deleted from the table 600.

Thereafter, the control section 30 locks the storage frame (Step S9). For instance, when the storage bag 21 is taken out from the storage frame A, and the recognition information 123456789 is deleted from the table 600, the control section 30 locks the cover 43 (that is, a switching process from the second state to the first state is performed). As a result, it is possible to preliminarily prevent a new storage bag from being mounted on the storage frame after the storage bag is taken out and before the recognition information on the new storage bag is read.

When a new storage bag is mounted on the storage frame A next time, recognition information is read from the new storage bag, and the recognition information on the new storage bag is stored in a box corresponding to the storage frame A in the right column of the table 600.

The information to be deleted from the table 600 is not limited to the recognition information on the storage bag in the right column, but the information relating to the storage frame A in the left column may also be deleted. In this case, when a new storage bag is mounted on the storage frame A next time, the recognition information on the new storage bag is associated with the information relating to the storage frame A, and the associated information is stored in the table 600.

When it is determined that a storage bag has not been mounted on the selected storage frame or that the recognition information on the mounted storage bag has not been correctly input (no in Step S6), the control section 30 terminates the operation.

When a user or the like incorrectly manipulates the manipulation display 9, it might be determined that a storage bag has not been mounted on the selected storage frame. In this case, a user or the like re-performs the manipulation from the outset so that the storage bag to be detached can be detached, or the storage bag to be mounted can be mounted.

When the correct manipulation is not performed when mounting a storage bag, it might be determined that recognition information on the mounted storage bag has been incorrectly input, which is however impossible to occur in the first place. That is, there is a possibility that a certain trouble occurs. Accordingly, in this case, the control section 30 may, for instance, make the cover of the selected storage frame unopenable unless a user or the like possessing a particular authority manipulates the manipulation display 9.

Heretofore, one embodiment of the present invention has been described. However, the present invention can be altered in various manners without departing from the purpose thereof. Hereinafter, examples thereof will be described.

Figure 10:
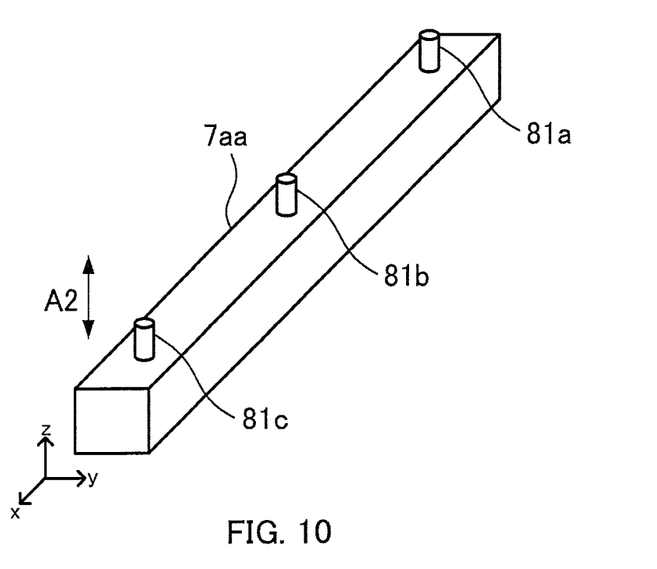
FIG. 10 is a perspective view of another example of one of the mounting sections in the storage frame.

FIG. 10 is a perspective view illustrating a variation of the mounting section 7aa in the storage frame A. The same members as those illustrated in FIG. 5 are provided with the same reference signs. The pins 81a to 81c are provided on the upper surface of the mounting section 7aa. The pins 81a to 81c are driven by a driving mechanism (not illustrated) and are configured to be movable in a direction of an arrow A2 so as to protrude from the upper surface of the mounting section 7aa.

As illustrated in FIG. 10, when the pins 81a to 81c protrude from the upper surface of the mounting section 7aa, the holes 71a to 71c of the storage bag 21 can be engaged with the pins 81a to 81c.

When the pins 81a to 81c are flush with or sunk from the upper surface of the mounting section 7aa, on the other hand, the holes 71a to 71c of the storage bag 21 cannot be engaged with the pins 81a to 81c.

As described above, it is possible to switch between the state in which the storage bag 21 can be mounted on the mounting section 7aa and the state in which the storage bag 21 cannot be mounted thereon by altering the protrusion state of each pin. The mounting section 7ab can also be configured similarly. In addition, the mounting sections 7aa, 7ab of the storage frame B can also be configured similarly.

Figure 11:
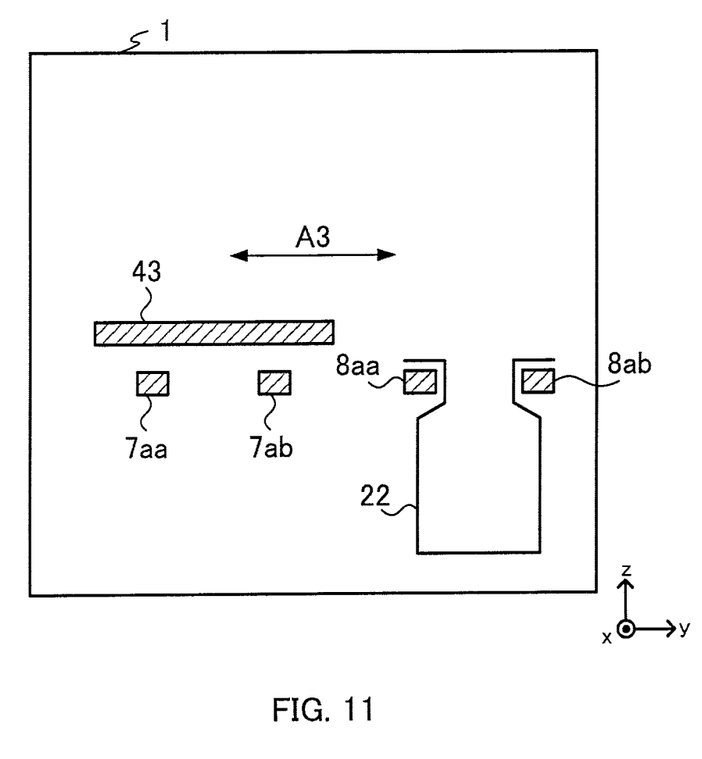
FIG. 11 is a diagram illustrating another example of a cover of the storage frame.

FIG. 11 is a schematic diagram illustrating a variation of the cover 43. The same members as those illustrated in FIGS. 1 and 5 are provided with the same reference signs. In this variation, the cover 43 is separate from and is disposed above the mounting sections 7aa, 7ab. The cover 53 has not been mounted on a storage unit B (that is, the mounting sections 8aa, 8ab). The cover 43 is formed to be movable in a direction denoted by an arrow A3 (horizontal direction) between above the mounting sections 7aa, 7ab and above the mounting sections 8aa, 8ab by a driving mechanism (not illustrated).

As illustrated in FIG. 11, when the cover 43 is located above the mounting sections 7aa, 7ab, the mounting sections 7aa, 7ab are covered with the cover 43. The mounting sections 7aa, 7ab are therefore in the state in which the storage bag 21 cannot be mounted thereon. Conversely, the cover 43 does not cover above the mounting sections 8aa, 8ab so that the mounting sections 8aa, 8ab are in the state in which the storage bag 22 can be mounted thereon.

When the cover 43 moves above the mounting sections 8aa, 8ab, on the other hand, the cover 43 no longer covers above the mounting sections 7aa, 7ab so that the mounting sections 7aa, 7ab are in the state in which the storage bag 21 can be mounted thereon. Conversely, the cover 43 covers above the mounting sections 8aa, 8ab so that the mounting sections 8aa, 8ab are in the state in which the storage bag 22 cannot be mounted thereon.

As described above, it is possible to switch between the state in which the storage bag 21 can be mounted on the mounting section 7aa and the state in which the storage bag 21 cannot be mounted thereon even by moving one of the covers: the cover 43 between above the mounting sections 7aa, 7ab and above the mounting sections 8aa, 8ab. At the same time, it is possible to switch between the state in which the storage bag 22 can be mounted on the mounting section 8aa and the state in which the storage bag 22 cannot be mounted thereon. What is more, this variation enables the cover 43 to be shared by two of the storage frames A, B so that the number of parts can be reduced.

In addition, the banknote processing apparatus 1 may comprise a driving section that drives both or one of the mounting sections 7aa, 7ab so that the mounting sections 7aa, 7ab move in directions for mutually approaching and mutually separating from each other (the ±y direction). In this case, it is possible to switch between the state in which the storage bag 21 cannot be mounted and the state in which the storage bag 21 can be mounted by the control section 30 operating the driving section to change the distance between the mounting sections 7aa, 7ab.

In the state in which the storage bag 21 can be mounted (the second state), for instance, a first distance is provided between the mounting section 7aa and the second mounting section 7ab. The first distance is, for instance, a distance between the mounting sections 7aa, 7ab illustrated in FIG. 1, which enables the holes 71a to 71c of the storage bag 21 to be mounted on the pins 81a to 81c of the mounting section 7aa, and the holes 72a to 72c of the storage bag 21 to be mounted on the pins 82a to 82c of the mounting section 7ab.

In the state in which the storage bag 21 cannot be mounted (the first state), on the other hand, a second distance, which is larger than the first distance, is provided between the mounting sections 7aa, 7ab. The second distance is, for instance, larger than a distance between the holes 71a to 71c and the holes 72a to 72c of the storage bag 21 when the holes 71a to 71c of the storage bag 21 are most separated from the holes 72a to 72c thereof (when the opening of storage bag 21 is most widened). In this case, the storage bag 21 will be broken if the storage bag 21 is forcibly mounted so that the storage bag 21 cannot be mounted.

In addition, the state in which the storage bag 21 cannot be mounted (the first state) may be realized by bringing the mounting section 7aa into contact with the mounting section 7ab. In this case, a storage bag cannot be inserted between the mounting sections 7aa, 7ab so that the storage bag 21 cannot be mounted.

Furthermore, the recognition information acquisition section 10 may not be limited to a handy type recognition information acquisition section that a user or a collector can hold by hand, but may also be a recognition information acquisition section installed in the inside of the banknote processing apparatus 1. The recognition information acquisition section 10 is so disposed that the recognition information on the storage bag 21 mounted on the storage frame A and the recognition information on the storage bag 22 mounted on the storage frame B can be read. In addition, one recognition information acquisition section 10 may be provided to read the recognition information on the storage bags 21, 22, or two recognition information acquisition sections 10 may be provided so that the recognition information on the storage bag 21 is read by one of the recognition information acquisition sections 10 and the recognition information on the storage bag 22 is read by the other recognition information acquisition section 10.

The recognition information acquisition section 10 is installed in the inside of the banknote processing apparatus 1 so that the recognition information on the storage bags 21, 22 installed in the storage frames A, B can be directly read. In this way, it is possible to preliminarily prevent the recognition information on the storage bags 21, 22, which are not mounted on the storage frames A, B, from being mistakenly read. In addition, the recognition information acquisition section 10 may be an imaging apparatus. For instance, recognition information such as a barcode may be read by imaging with a camera.

As containers for storing the banknotes to be used together with the banknote processing apparatus 1, bags or cassettes formed of a metal or resin, the whole or part of which has a relatively high rigidity, may be used instead of flexible and thermally weldable containers such as the storage bags 21, 22.

Furthermore, recognition information on a storage bag, which has been used once and whose recognition information has been read by the recognition information acquisition section 10, may be stored in the memory section 61 or a host apparatus. The recognition information on the once-used storage bag is stored so that the control section 30 or a host apparatus can determine whether the recognition information, which has been newly read and input, coincides with the recognition information given to the once-used storage bag. When the recognition information of both has been determined as coinciding, the control section 30 or the host apparatus can display the coincidence on the manipulation display 9 to call attention of a user or the like. In addition, the control section 30 or the host apparatus may be configured to make it impossible to switch the states of the storage frames A, B, that is, to make it impossible to mount any storage bag. In this way, it is possible to preliminarily prevent a storage bag, whose reuse is prohibited or which cannot be reused in the first place, from being reused for a certain reason.

In addition, an information processing apparatus such as a personal computer and a server, which is connected to the banknote processing apparatus 1, may associate the recognition information on the storage bags 21, 22 with the storage frame information on the storage frames A, B. For instance, the information processing apparatus may have the function of the control section 30, and may receive the recognition information on the storage bags 21, 22 and the storage frame information on the storage frames A, B which are transmitted from the recognition information acquisition section 10. The information processing apparatus associates the recognition information on the storage bags 21, 22 with the storage frame information on the storage frames A, B, and stores the associated information in the memory section such as a memory. In addition, a host apparatus may have the function of the information processing apparatus.

INDUSTRIAL APPLICABILITY

The present invention can be used suitably for a valuable medium processing apparatus which stores a valuable medium such as a banknote in a detachable container such as a storage bag.

REFERENCE SIGNS LIST 1 banknote processing apparatus
2 inlet section
2a feeding mechanism unit
3 transport unit
4 recognition unit
5 temporary storage section
6 outlet section
6a stacking wheel driving section
A, B storage frame
7aa, 7ab, 8aa, 8ab mounting section
7ba, 7bb, 8ba, 8bb stage
9 manipulation display
10 recognition information acquisition section
21, 22 storage bag
30 control section
41, 51 stage driving section
42, 52 heating section
43, 53 cover
61 memory section
62 communication interface section
71a to 71c, 72a to 72c hole
73 barcode
81a to 81c, 82a to 82c pin
P1 banknote

The invention claimed is:

1. A valuable medium processing apparatus for storing a valuable medium in a container comprising:
  a mounting section configured to mount the container thereto;
  a setting mechanism configured to set a state of the mounting section to either a first state in which the container is not capable of being mounted to the mounting section or a second state in which the container is capable of being mounted to the mounting section; and
  a control section configured to control the setting mechanism.

2. The valuable medium processing apparatus according to claim 1, wherein the mounting section comprises a plurality of mounting units each configured to mount the container thereto, the valuable medium processing apparatus further comprising:

an operation section configured to select a first mounting unit among the mounting units, wherein the control section is configured to control the setting mechanism to set a state of the first mounting unit selected by the operation section to the second state.

3. The valuable medium processing apparatus according to claim 2, wherein the control section is configured to control the setting mechanism to set a state of a second mounting unit, among the mounting units, not selected by the operation section to the first state.

4. The valuable medium processing apparatus according to claim 2, further comprising:

an information acquisition section configured to read recognition information given to the container, wherein the control section is configured to switch the state of the selected first mounting unit from the first state to the second state when the control section receives the selection of the first mounting unit among the mounting units and further receives recognition information read by the information acquisition section.

5. The valuable medium processing apparatus according to claim 4, further comprising:

a memory section configured to store information therein, wherein the control section is configured to associate information relating to the selected first mounting unit with the recognition information read by the acquisition section and to store the associated information in the memory section.

6. The valuable medium processing apparatus according to claim 5, wherein the control section is configured, when the recognition information read by the acquisition section corresponding to information relating to the selected first mounting unit is deleted from the memory section, to switch the state of the first mounting unit corresponding to deleted recognition information from the second state to the first state.

7. The valuable medium processing apparatus according to claim 5, wherein the control section is configured, when the information relating to the selected first mounting unit is deleted from the memory section, to switch the state of the first mounting unit corresponding to deleted information from the second state to the first state.

8. The valuable medium processing apparatus according to claim 5, wherein the control section is configured to cause the information relating to the selected first mounting section, the recognition information, and information on the valuable medium stored in the container of the recognition information to correspond to each other and to be stored in the memory section.

9. The valuable medium processing apparatus according to claim 1, wherein the mounting section has a mechanism that inhibits the container from being mounted.

10. The valuable medium processing apparatus according to claim 1, wherein the mounting section comprises a first mounting section on which a first part of the container is mounted, and a second mounting section on which a second part of the container is mounted, and wherein the valuable medium processing apparatus further comprises a driving section which drives, depending on a control of the control section, at least one of the first mounting section and the second mounting section in a direction in which the first mounting section and the second mounting section are opposite to each other, wherein the state of the mounting section is set to either the first state or the second state by operation of the driving section which changes a distance between the first mounting section and the second mounting section.

11. The valuable medium processing apparatus according to claim 10, wherein the first mounting section and the second mounting section are apart from each other by a first distance in the second state, and the first mounting section and the second mounting section are apart from each other by a second distance which is larger than the first distance or are in contact with each other in the first state.

12. The valuable medium processing apparatus according to claim 1, wherein the container is a bag or a cassette.

13. The valuable medium processing apparatus according to claim 1, wherein the mounting section includes an engaging section configured to engage with the container, the setting mechanism includes a cover for covering or exposing the engaging section, and the second state is a stage in which the cover exposes the engaging section.

14. The valuable medium processing apparatus according to claim 1, wherein the valuable medium is a sheet including a banknote, securities and a ballot or a coin.

15. The valuable medium processing apparatus according to claim 1 further comprising:

a locking mechanism for preventing the state of the mounting section from changing.

* * * * *